United States Patent Office 3,318,915
Patented May 9, 1967

3,318,915
OIL-SOLUBLE ALPHA-HYDROXYMETHYL PHOSPHONATE DIESTERS
Ulrich Hasserodt, Holzlar, Siegburg, Kurt H. G. Pilgram, Bonn-Dransdorf, and Friedrich W. A. G. K. Korte, Hangelar, Germany, assignors to Shell Oil Company, New York, N.Y., a corporation of Delaware
No Drawing. Filed Oct. 21, 1965, Ser. No. 500,330
Claims priority, application Germany, Nov. 13, 1961, S 76,664
9 Claims. (Cl. 260—345.9)

This patent application is a continuation-in-part of copending patent application Ser. No. 205,231 filed June 26, 1962, now U.S. Patent No. 3,247,113.

The invention relates to a new and novel class of oil-soluble alpha-hydroxy phosphonate diesters, having excellent corrosion inhibiting properties, represented by the formula:

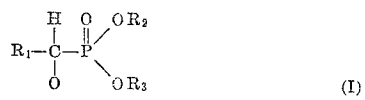

(I)

wherein $R_1$ is a 5 or 6 member oxygen-containing heterocyclic radical such as pyranyl or furyl radicals, which may contain polar and/or nonpolar substituent groups attached to the carbon atoms in the heterocyclic ring and $R_2$ and $R_3$ are hydrocarbyl radicals, at least one of which is a long aliphatic branched or unbranched hydrocarbon group having at least 6 carbon atoms, prepared by a novel process of the present invention. The formation of the diesters of the present invention as represented by Formula I is unexpected since it is known that esterification of hydroxy phosphonic acids with higher alcohols generally results in partial or monoesterification as evidenced by reference to Drake and Marvel in the Journal of Organic Chemistry, 2 (1937), pages 387–399.

The diesters of the present invention as represented by Formula I are prepared by the conversion of dialkyl hydrogen phosphites with the corresponding carbonyl compounds, such as aldehydes and ketones, by the catalytic action of basic materials. The basic catalyst is essential since it is possible to heat mixtures of aldehydes and dialkyl hydrogen phosphites without any perceptible reaction taking place. If, however, a small quantity of basic material is present, such as sodium ethylate or triethylamine, the reaction starts instaneously with evolution of heat with the formation of alpha-hydroxymethyl phosphonic acid diesters. For instance, the reaction between dimer acrolein and dialkyl phosphite in which 2[2,3-dihydro-gamma-pyranyl]alpha-hydroxymethyl phosphonic acid dialkyl ester is formed proceeds as follows:

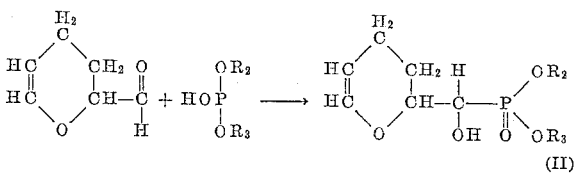

(II)

The formation of 2-furyl-alpha-hydroxymethyl phosphonic acid dialkyl ester from furfural and dialkyl hydrogen phosphite proceeds in the same way:

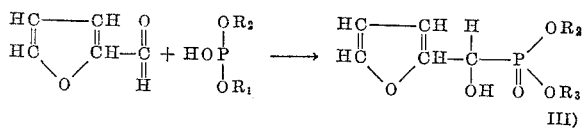

(III)

The symbols $R_2$ and $R_3$ in compounds represented by (II) and (III) are the same as in Formula I and specifically at least one unbranched hydrocarbon group. Compounds in which at least one of the $R_2$ or $R_3$ groups has at least 6 and preferably up to 16 carbon atoms effect a particularly good improvement in the adhesion and thus prevent the oxidation of mineral oil-based lubricants or lubricating greases. Good results are also obtained when the compounds according to the invention contain an $R_2$ or $R_3$ group having more than 16 carbon atoms.

The following are illustrative examples of substituted alpha-hydroxy phosphonic acid diesters which may be used according to the invention: 2-[2,3-dihydro-gamma-pyranyl]alpha-hydroxymethyl phosphonic acid -di-n-alkyl esters, in which the alkyl groups are n-amyl-, n-octyl-, n-dodecyl-, n-tetradecyl-, n-hexadecyl-groups; 2-furyl-alpha-hydroxymethyl phosphonic acid-di-n-alkyl esters, in which the alkyl groups are n-octyl-, n-dodecyl-, n-tetradecyl-, n-hexadecyl-groups; and also 2-[2,3-dihydro-gamma-pyranyl]alpha-hydroxymethyl phosphonic acid-ethyl-n-hexyl esters and 2-furyl-alpha-hydroxymethyl phosphonic acid ethyl-n-hexyl esters.

The dialkyl hydrogen phosphites required for the preparation of alpha-hydroxymethyl phosphonic acid dialkyl esters are prepared by reacting phosphorous trichloride (1 mole) with the corresponding alcohol (3 moles) in the presence of a tertiary amine such as pyridine (Py) (2 moles), according to the following reaction scheme:

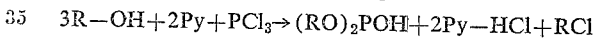

In this way it was possible for the first time to prepare extremely pure, long-chain dialkyl phosphites, e.g., in which $R=n-C_{12}H_{25}$; $n-C_{14}H_{29}$; $n-C_{16}H_{33}$, which consequently represent new compounds.

According to the above process, it is only possible to prepare symmetric dialkyl hydrogen phosphites. Asymmetric dialkyl hydrogen phosphites, in particular those having at least one long-chain alkyl group, are produced in a novel way by reacting an alcohol with phosphorus acid ester dichloride in the presence of a tertiary amine, such as pyridine, according to the following reaction scheme:

Thus, a 79% yield of the compound ethyl-n-hexyl hydrogen phosphite not yet described in the literature was obtained by reacting ethanol (2 moles) with the mixture of $n.C_6H_{13}OPCl_2$ (1 mole) and pyridine (1 mole) in petroleum ether at 0° C.

The likewise novel compound ethyl-n-octyl hydrogen phosphite was obtained in the same way.

The novel alpha-hydroxymethyl phosphonic acid diesters are partly difficulty distillable liquids and partly crystalline materials which are either odorless or have slight but agreeable odor. They are readily soluble in oil and have no irritating effect on the skin.

The following examples specifically illustrate the additives of the present invention.

*Example I.—2-[2,3-dihydro-gamma-pyranyl]alpha-hydroxymethyl phosphonic acid-di-n-amyl ester*

A quantity of 103 g. (0.93 mole) of dimer acrolein (2-formyl-2,3-dihydro-alpha-pyran) was mixed with 206 g. (0.93 mole) of di-n-amylphosphite. A sodium ethylate solution was added dropwise with stirring. The first drops should be added with great care as the temperature will rise spontaneously. The reaction mixture was then suitably externally cooled with ice-water to prevent the temperature from exceeding 80° C., and the reaction was stopped by adding additional di-n-amylphosphite to ascertain whether the temperature rose again. When this is no longer the case, the reaction product is neutralized with acetic acid and distilled in vacuo.

B. P. $_{(0.001\ mm.)}$=122–125° C.; $n_D^{20}$=1.4625; yield= 102 g. (33% of theory). $C_{16}H_{31}O_5P$—Calculated: P=9.3%. Found: P=9.34%.

*Example II.—2-[2,3-dihydro-gamma-pyranyl] alpha-hydroxymethyl phosphonic acid-di-n-hexyl ester*

A quantity of 55 g. (a slight excess) of dimer acrolein was mixed with 100 g. of di-n-hexylphosphite and reacted as in Example I. After neutralizing with acetic acid the mixture was taken up in ether, the ethereal solution washed once with a solution of sodium hydrogen sulfite and subsequently with ice-water and dried over sodium sulfate. After the ether had been distilled off the material was freed from remaining solvent for one hour at 120° C. and a pressure of 0.05 mm. Hg. Yield 120 g. (83.5% of theory); $n_D^{20}$=1.4704.

A sample was distilled in high vacuum:

B.P.$_{(0.003\ mm.)}$=157–158° C.; $n_D^{20}$=1.4581.

$C_{18}H_{35}O_5P$—Calc.: P=8.56%. Found: P=8.76%.

*Example III.—2-[2,3-dihydro-gamma-pyranyl] alpha-hydroxymethyl phosphonic acid-di-n-octyl ester*

A quantity of 60 g. (a slight excess) of dimer acrolein was mixed with 153 g. of di-n-octylphosphite and reacted as in Example I. The resultant reaction mixture was worked up as in Example II.

Yield 171.5 g. (80% of theory); $n_D^{20}$=1.4689. $C_{22}H_{43}O_5P$—Calculated: P=7.4%. Found: P=7.61%.

*Example IV.—2-[2,3-dihydro-gamma-pyranyl] alpha-hydroxymethyl phosphonic acid-di-n-dodecyl ester*

(a) A quantity of 558 g. (3 moles) of lauryl alcohol was dissolved in 1.5 liters of petroleum ether in a 4-liter three-necked flask provided with a reflux condenser and drying tube, stirrer and dropping funnel. A quantity of 158 g. (2 moles) of pyridine was added and the mixture cooled to 0° C. with stirring. A quantity of 137.5 g. (1 mole) of phosphorus trichloride was then gradually added dropwise. After all the trichloride had been added the mixture was heated on a water bath to its boiling temperature for 2 hours while refluxing it. After cooling the mixture the pyridinium chloride formed was removed by suction, the precipitate subsequently washed with petroleum ether and the petroleum ether removed by distillation on a water bath. The di-n-dodecyl phosphite residue remaining in the distillation flask was removed by distillation in vacuo.

1st fraction—B.P.$_{(11\ mm.)}$: 140–145° C.; 190 g. (93% of theory) of dodecyl chloride.

2nd fraction—B.P.$_{(0.001\ mm.)}$: 193–195° C.; 140 g. (33% of theory). $n_D^{20}$: 1.4472. M.P.: 30° C. $C_{24}H_{51}O_3P$—Calculated: P=7.42%. Found: P=7.02%.

(b) A quantity of 24 g. (1.6 g. excess) of dimer acrolein was mixed with 83.6 g. (0.2 mole) of di-n-dodecyl phosphite prepared according to (a) and reacted as in Example I. The reaction mixture was worked up as in Example II.

Yield 87 g. (82% of theory); $n_D^{20}$=1.4700.

After some time the ester turned crystalline and could be recrystallized from ether. M.P.=39.5–40.5° C. $C_{30}H_{59}O_5P$—Calculated: P=5.83%. Found: P=5.27%.

*Example V.—2-[2,3-dihydro-gamma-pyranyl] alpha-hydroxymethyl phosphonic acid-di-n-tetradecyl ester*

(a) A quantity of 160.5 g. (0.75 mole) of tetradecyl alcohol was dissolved in 600 ml. of petroleum ether in a 2-liter three-necked flask, a quantity of 39.5 g. (0.5 mole) of pyridine being subsequently added. The flask was provided with a reflux condenser and drying tube and a quantity of 34.4 g. (0.25 mole) of phosphorus trichloride was added dropwise with ice-cooling and stirring. After all the trichloride had been added the mixture was heated on a water bath to its boiling temperature for 4 hours with stirring, and after cooling the mixture the pyridinium chloride was removed by suction, after which the precipitate was thoroughly washed with petroleum ether. The petroleum ether was combined with the filtrate and the solvent subsequently removed on a water bath, the di-n-tetradecyl phosphite residue being subjected to distillation in vacuo.

1st fraction—B.P.$_{(0.03\ mm.)}$: 95° C. Yield: 42 g. (72.5% of theory) of myristyl chloride.

2nd fraction—B.P.$_{(0.04\ mm.)}$: 180–230° C., 10 g., intermediate fraction.

3rd fraction—B.P.$_{(0.04\ mm.)}$: 230° C. Yield: 95 g. (78% of theory). M.P.: 39–40° C. Solidification point: 28° C. $C_{28}H_{59}O_3P$ — Calculated: P=6.55%. Found: P=6.05%.

(b) A quantity of 3.5 g. of dimer acrolein was mixed with 14.4 g. of di-n-tetradecyl phosphite prepared according to (a) and reacted as in Example I. The reaction mixture was worked up as in Example II and the crude product recrystallized from methanol.

Yield: 7.5 g. (34% of theory); M.P. 51–52° C. $C_{34}H_{67}O_5P$—Calculated: P=5.28%. Found: P=5.25%.

*Example VI.—2-[2,3-dihydro-gamma-pyranyl] alpha-hydroxymethyl phosphonic acid-di-n-hexadecyl ester*

(a) A quantity of 181.5 g. (0.75 mole) of cetyl alcohol was dissolved in 600 ml. petroleum ether in a 2-liter three-necked flask, 39.5 g. (0.5 mole) of pyridine being subsequently added. A quantity of 34.4 g. (0.25 mole) of phosphorus trichloride was slowly added dropwise at 0° C. with stirring and cooling, the mixture then being heated to its boiling temperature for 4 hours while refluxing it. After cooling the mixture the pyridinium chloride was removed by suction after which the precipitate was washed with petroleum ether, the petroleum ether was removed on a water bath with a reflux condenser and the flask residue containing di-n-hexadecyl phosphite distilled in vacuo.

1st fraction—B.P.$_{(0.03\ mm)}$: 135° C. Yield: 48 g. (74% of theory) of cetyl chloride.

2nd fraction—B.P.$_{(0.02\ mm.)}$: 180–245° C., 15 g., intermediate fraction.

3rd fraction—B.P.$_{(0.02\ mm.)}$: 245–250° C. Yield: 100 g. (75.5% of theory). M.P.: 46–47° C.; Solidification point: 34.5° C. $C_{32}H_{65}O_3P$—Calculated: P=5.85%. Found: P=5.78%.

(b) A quantity of 3.19 g. of dimer acrolein was mixed with 15 g. of di-n-hexadecyl phosphite prepared according to (a) and reacted as in Example I. The reaction mixture was worked up as in Example II and the crude product recrystallized from methanol.

Yield: 6.5 g. (36% of theory). M.P.: 48° C. $C_{38}H_{75}O_5P$—Calculated: P=4.83%. Found: P=5.18%.

*Example VII.—2-furyl-alpha-hydroxymethyl phosphonic acid-di-n-octyl ester*

A quantity of 9.6 g. (0.1 mole) of furfural together with 30.6 g. (0.1 mole) of di-n-octyl phosphite were heated to 80° C. in an oil bath. 1 ml. of triethylamine was then added dropwise, whereupon the reaction solution heated to 85° C. The solution was left to stand at 80° C. for a further 4 hours. The reaction product was washed with a solution of sodium hydrogen sulphite and subsequently with water, taken up in ether and dried over sodium sulfate. After removal of the ether, finally at 100° C. and under a pressure of 0.5 mm. Hg, a yellow oil remained behind.

Yield: 35.5 g. (89% of theory); $n_D^{20}=1.4617$. $C_{21}H_{39}O_5P$—Calculated: P=7.7%. Found: P=7.9%.

*Example VIII.—2-furyl-alpha-hydroxymethyl phosphonic acid-di-n-dodecyl ester*

A quantity of 4.8 g. (0.05 mole) of furfural and 20.9 g. (0.05 mole) of di-n-dodecyl phosphite prepared as in Example IV(a) were reacted as in Example VII. After working up, a yellow oil remained behind.

Yield: 21 g. (82% of theory); $n_D^{20}=1.4682$. $C_{29}H_{55}O_5P$—Calculated: P=6.03%. Found: P=6.25%.

*Example IX.—2-furyl-alpha-hydroxymethyl phosphonic acid-di-n-tetradecyl ester*

A quantity of 4.8 g. (0.05 mole) of furfural together with 23.7 g. (0.05 mole) of di-n-tetradecyl phosphite prepared as in Example V(a) were heated at 80° C. in an oil bath. A quantity of 1.5 ml. of triethylamine was subsequently added dropwise, whereupon the reaction solution heated to 85° C. The solution was left to stand at 80° C. for a further 4 hours. A yellow oil was obtained which was freed from triethylamine and unconverted starting materials at 100° C. under a pressure of 0.01 mm. Hg. After cooling the product a bright yellow mass of waxy consistency which melted between 20° C. and 25° C. remained behind.

Yield: 27 g. (95% of theory). $C_{33}H_{63}O_5P$—Calculated: P=5.43%. Found: P=5.5%.

*Example X.—2-furyl-alpha-hydroxymethyl phosphonic acid-di-n-hexadecyl ester*

A quantity of 4.8 g. (0.05 mole) of furfural together with 26.5 g. (0.05 mole) of di-n-hexadecyl phosphite prepared as in Example VI(a) were reacted as in Example VII. After working up the solution as in the previous example a yellow waxy reaction product remained behind, which could not be recrystallized from methanol or petroleum ether.

Yield: 30.5 g. (97.5% of theory); M.P.=20° C. $C_{37}H_{71}O_5P$—Calculated: P=4.95%. Found: P=4.79%.

*Example XI.—2-[2,3-dihydro-gamma-pyranyl] alpha-hydroxymethyl phosphonic acid ethyl-n-hexyl ester*

(a) A quantity of 500 ml. of petroleum ether and 185 g. of n-hexoxydichlorophosphine ($C_6H_{13}OPCl_2$) were put in a 2-liter three-necked flask provided with a reflux condenser and drying tube, stirrer and dropping funnel. A mixture of 84 g. of ethanol and 72 g. of pyridine was then carefully added dropwise with ice-cooling and stirring. After completion of the addition the product was stirred for 2 hours at room temperature, freed from pyridinium chloride by suction and, after the petroleum ether had been removed in vacuo, distilled through a 20 cm. vacuum-jacketed column.

1st fraction—(diethyl phosphite) B.P.$_{(12\ mm.)}$: 62–68° C. $n_D^{20}$: 1.4102.

2nd fraction—(ethyl - n - hexyl hydrogen phosphite) B.P.$_{(12\ mm.)}$: 118–120° C. Yield: 140 g. (79% of theory). $n_D^{20}$: 1.4249. $C_8H_{19}O_3P$—Calculated: P=15.97%. Found: P=15.9%.

(b) A quantity of 11.2 g. (0.1 mole) of dimer acrolein and 19.4 g. (0.1 mole) of ethyl-n-hexyl hydrogen phosphite prepared according to (a) were introduced into a 100 ml. flask provided with reflux condenser, stirrer and dropping funnel. A quantity of 1 ml. of triethylamine was slowly added dropwise at 20° C. with stirring, the inside temperature rising to 73° C. The reaction product turned reddish brown and was left to stand at 70° C. for a further 3 hours. After being cooled and taken up in ether the product was washed with 20 ml. of sodium hydrogen sulfite solution and then with ice water, and subsequently dried over sodium sulfate. The ether was removed by distillation and the remaining unconverted esters were finally removed at 100° C. and a pressure of 0.05 mm. Hg. A reddish-yellow, bright oil remained behind.

Yield: 30.2 g. (98.5% of theory). $n_D^{20}$: 1.4700. $C_{14}H_{27}O_5P$—Calculated: P=10.13%. Found: P=9.95%.

*Example XII.—2-furyl-alpha-hydroxymethyl phosphonic acid ethyl-n-hexyl ester*

A quantity of 9.6 g. (0.1 mole) of furfural and 19.4 g. (0.1 mole) of ethyl-n-hexyl hydrogen phosphite prepared as in Example XI(a) were reacted as in Example XI(b). After working up the mixture a yellow oil with $n_D^{20}=1.4735$ remained behind.

Yield: 26 g. (89.7% of theory). $C_{13}H_{23}O_5P$—Calculated: P=10.69%. Found: P=10.7%.

*Example XIII.—2-[2,3-dihydro-gamma-pyranyl] alpha-hydroxymethyl phosphonic acid ethyl-n-octyl ester*

(a) A quantity of 222 g. of n.$C_8H_{17}OPCl_2$ was slowly added dropwise with stirring and ice-cooling to a solution of 88.5 g. of ethanol and 76 g. of pyridine in 600 ml. of petroleum ether contained in a 2-liter three-necked flask provided with reflux condenser and drying tube, stirrer and dropping funnel. After completion of the addition stirring was continued at room temperature for 2 hours, the product freed from pyridinium chloride by suction, the petroleum ether then removed on a water bath by distillation and the residue, containing ethyl-n-octylhydrogen phosphite, distilled in vacuo.

1st fraction — B.P.$_{(0.04\ mm.)}$: 30–60° C. (70 g.); $n_D^{20}=1.4192$; P content=11.35%.

2nd fraction—B.P.$_{(0.02\ mm.)}$: 92–96° C.; $n_D^{20}=1.4290$. Yield: 65.0 g. (30.4% of theory). $C_{10}H_{23}O_3P$—Calculated: P=13.96%. Found: P=14.1%.

(b) A quantity of 5.6 g. of dimer acrolein and a quantity of 11.1 g. of ethyl-n-octylhydrogen phosphite prepared as in (a) were reacted as in Example XI(b) and worked up. A yellowish, bright oil was obtained.

Yield: 15.4 g. (92% of theory); $n_D^{20}=1.4172$. $C_{16}H_{31}O_5P$—Calculated: P=9.28%. Found: P=9.65%.

*Example XIV.—2-furyl-alpha-hydroxymethylphosphonic acid ethyl-n-cetyl ester*

A quantity of 4.8 g. of furfural and a quantity of 11.1 g. of ethyl-n-octyl phosphite prepared as in Example XIII(a) were reacted as in Example XI(b) and worked up. A quantity of 15.1 g. (95% of theory) of a yellow oil was obtained.

$n_D^{20}=1.4733$. $C_{15}H_{27}O_5P$ — Calculated: P=10.4%. Found: P=10.2%.

The amount of novel alpha-hydroxymethyl phosphonic acid diesters to be used depends on the particular lubricant to which they are added and on the use for which the lubricant is intended. The lubricant may be used in amounts varying from 0.01 to 10% or more, occasionally it is also possible to use less than 0.01%, for instance 0.001%.

The lubricating materials, which together with the alpha-hydroxymethyl phosphonic acid diesters yield very high-grade lubricants, are neutral fluids which may be hydrocarbons or mixtures of hydrocarbons, for instance, any desired mineral lubricating oil. The fluid may be thickened to a grease with a thickening agent. Synthetic oils, such as polymerized olefins or combined polymers of alkylene glycols and alkylene oxides, are also suitable for use as neutral fluid. The lubricants may also be mixtures of synthetic lubricating materials and natural oils. In addition to the alpha-hydroxymethyl phosphonic acid diesters other additives, such as pour point depressants or viscosity improvers, may be admixed with the lubricant.

The following experiments show the superiority of the lubricants according to the invention to the conventional lubricants, in which trialkyl phosphites are admixed as additives. The rust-preventing characteristics of turbine oils were measured in the presence of water according to ASTM standard D665–54. According to this method cylindrical steel specimens are immersed in 300 ml. of the oil under test together with 30 ml. of distilled water, the test being run for 24 hours at a temperature of 60° C. An estimate is than made of the percentage of rusting of the metal surface (cf. 1958 Book of ASTM Standards, Part 7, page 303). The results are given in the following table.

$$R_1-\overset{H}{\underset{OH}{C}}-\overset{O}{\underset{}{P}}\overset{OR_2}{\underset{OR_3}{}}$$

wherein $R_1$ is an organic heterocyclic radical selected from the group consisting of

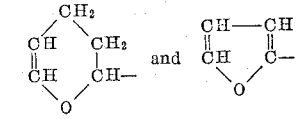

RUST-PREVENTING CHARACTERISTICS OF TURBINE BASE OILS CONTAINING AN AMOUNT OF ALPHA-HYDROXYMETHYL PHOSPHONIC ACID DIESTER OF THE FORMULA $$R_1-\overset{H}{\underset{OH}{C}}-\overset{OR_2}{\underset{O}{P}}\overset{}{\underset{OR_3}{}}$$

| Additive with 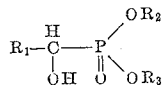 and $R_2=R_3=$ | Quantity, percent | Rust | Rust with control additive $(RO)_3P(0.1\%)$, percent $R=$ | Additive with 0.1% $R_1=$ and $R_2=R_3=$ | Rust, percent |
|---|---|---|---|---|---|
| $C_6H_5$ | 0.1 | 80 | | | |
| iso-$C_3H_7$ | 0.1 | 100 | | | |
| n-$C_4H_9$ | 0.1 | 60 | n-$C_4H_9$ | 80 | n-$C_3H_7$ | 100 |
| n-$C_5H_{11}$ | 0.1 | 30 | n-$C_5H_{11}$ | 50 | n-$C_4H_9$ | 90 |
| n-$C_6H_{13}$ | 0.1 | traces | n-$C_6H_{13}$ | 40 | n-$C_5H_{11}$ | 10 |
| n-$C_8H_{17}$ | 0.1 | traces | n-$C_8H_{17}$ | 40 | n-$C_6H_{13}$ | 5 |
| n-$C_{12}H_{25}$ | 0.1 | 0 | n-$C_{12}H_{25}$ | 20 | n-$C_8H_{17}$ | 0 |
| n-$C_{12}H_{25}$ | 0.05 | 0 | | | n-$C_{12}H_{25}$ | 0 |
| n-$C_{14}H_{29}$ | 0.01 | 0 | n-$C_{14}H_{29}$ | 40 | n-$C_{14}H_{29}$ | 0 |
| n-$C_{16}H_{33}$ | 0.1 | 0 | n-$C_{16}H_{33}$ | 30 | n-$C_{16}H_{33}$ | 0 |
| n-$C_{16}H_{33}$ | 0.02 | 0 | | | | |
| $R_2=C_2H_5$, $R_3=$n-$C_8H_{17}$ | 0.1 | traces | | | $R_2=C_2H_5$, $R_3=$n-$C_8H_{17}$ | 0 |
| $R_2=C_2H_5$, $R_3=$n-$C_6H_{13}$ | 0.1 | 10 | | | $R_2=C_2H_5$, $R_3=$n-$C_6H_{13}$ | 5 |
| $R_1=C_7H_{15}$, $R_2=R_3=C_2H_5$ | 0.1 | 20 | | | | |
| None | | 70 | | | | |

Turbine base oil without additive shows 70% rusting of the cylindrical steel specimens.

Additives of this invention are useful for providing stability and other desired properties to petroleum products such as mineral lubricating oils which also contain small amounts (0.1% to 3%) of other agents such as the folowing: detergents such as metal organic sulfonates, e.g., neutral or basic Ca, Ba, or Zn petroleum sulfonates or non-ash forming detergents such as Acryloids of the 300 and 900 series, e.g., "Acryloid" 917, 966 or 315X which are copolymers of vinyl pyrrolidone and lauryl methacrylate of varying molecular weight such as of from 200,000 and 1,000,000 and described in Canadian Patent 592,974 or copolymers of vinyl pyridine and alkyl methacrylate as described in U.S. Patents 2,839,512, 2,889,282, 2,915,471 and 2,944,974; viscosity index improvers and pour point depressants such as the oil-soluble polymethacrylates available under the name "Acryloids" of the 100, 600 and 700 series and, specifically, "Acryloid" 150, 618, 710 and 768, described in U.S. Patent 2,710,842; condensation products of chlorinated paraffin wax and naphthalene; extreme pressure agents such as aliphatic amine salts of monochloromethanephosphonic acid or trichloromethanephosphonic acid, or the ester or amide of such acids; organic sulfides and mixtures thereof.

Additives of this invention can be used to improve insecticidal compositions, industrial fluids such as hydraulic and transmission fluids, coating compositions, fire-proofing compositions and many others.

We claim as our invention:

1. An oil-soluble alpha-hydroxy phosphonic acid diester having the formula where $R_2$ and $R_3$ are hydrocarbyl radicals one of which contains at least 6 carbon atoms.

2. The diester of claim 1 wherein the $R_2$ and $R_3$ are alkyl radicals containing from 6 to 16 carbon atoms.

3. The diester of claim 1 wherein $R_1$ is a pyranyl radical and $R_2$ and $R_3$ are alkyl radicals containing from 6 to 16 carbon atoms.

4. The diester of claim 1 wherein $R_1$ is furyl radical and $R_2$ and $R_3$ are alkyl radicals containing from 6 to 16 carbon atoms.

5. Oil-soluble 2-[2,3-dihydro-gamma-pyranyl] alpha-hydroxy-methyl phosphonic acid di-n-octyl ester.

6. Oil-soluble 2-furyl-alpha-hydroxymethyl phosphonic acid di-n-octyl ester.

7. Oil-soluble 2-[2,3-dihydro-gamma-pyranyl] alpha-hydroxy-methyl phosphonic acid di-n-dodecyl ester.

8. Oil-soluble 2-furyl-alpha-hydroxymethyl phosphonic acid di-n-dodecyl ester.

9. Oil-soluble 2-[2,3-dihydro-gamma-pyranyl] alpha-hydroxy-methyl phosphonic acid di-n-tetradecyl ester.

References Cited by the Examiner

UNITED STATES PATENTS 2,279,502    4/1942    Dickey et al. __ 260—347.8 XR
2,364,348    12/1944   Dickey et al. __ 260—374.8 XR WALTER A. MODANCE, *Primary Examiner.*

JOHN M. FORD, *Assistant Examiner.*